(12) United States Patent
Komatsu et al.

(10) Patent No.: US 8,573,343 B2
(45) Date of Patent: Nov. 5, 2013

(54) VEHICLE HEAT-EXCHANGE MODULE AND VEHICLE HAVING THE SAME

(75) Inventors: Yoshinao Komatsu, Takasago (JP); Tsuyoshi Eguchi, Takasago (JP); Atsushi Suzuki, Kiyosu (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 318 days.

(21) Appl. No.: 13/003,798

(22) PCT Filed: Nov. 4, 2009

(86) PCT No.: PCT/JP2009/068844
§ 371 (c)(1),
(2), (4) Date: Jan. 12, 2011

(87) PCT Pub. No.: WO2010/064517
PCT Pub. Date: Jun. 10, 2010

(65) Prior Publication Data
US 2011/0114286 A1      May 19, 2011

(30) Foreign Application Priority Data

Dec. 5, 2008   (JP) ................................ 2008-311307

(51) Int. Cl.
*B60K 11/08* (2006.01)
(52) U.S. Cl.
USPC ........................................ 180/68.4; 180/68.1
(58) Field of Classification Search
USPC .............................................. 180/68.4, 68.6
See application file for complete search history.

(56) References Cited

U.S. PATENT DOCUMENTS 5,341,871 A * 8/1994 Stelzer ........................... 165/121
5,454,695 A * 10/1995 Shah et al. ..................... 416/203

(Continued)

FOREIGN PATENT DOCUMENTS

JP   61-172973 U   10/1986
JP   10-205497 A   8/1998

(Continued)

OTHER PUBLICATIONS

Japanese Decision to Grant a Patent dated Jan. 15, 2013, issued in corresponding Japanese patent application No. 2008-311307, w/ English translation.

(Continued)

*Primary Examiner* — Jeffrey J Restifo
(74) *Attorney, Agent, or Firm* — Westerman, Hattori, Daniels & Adrian, LLP

(57) ABSTRACT

An object is to provide a vehicle heat-exchange module capable of optimizing the whole of a stator blade that deflects a flow in the swirling direction produced by a cooling fan, thereby reducing the work performed by the cooling fan and eventually reducing the input power to the cooling fan, and to provide a vehicle having the vehicle heat-exchange module. According to the vehicle heat-exchange module (10), the stator blade (30) arranged on the downstream side of the cooling fan (16) is divided by an intermediate ring (31) into inner-circumference-side stator blade members (32A) and outer-circumference-side stator blade members (32B), and the number of the inner-circumference-side stator blade members (32A) for installation is made smaller than that of the outer-circumference-side stator blade members (32B), thus setting the pitch/chord ratio within an appropriate range at each of the inner circumference side and the outer circumference side. As a result, a flow in the swirling direction produced by the cooling fan (16) is efficiently deflected by the whole of the stator blade (30), thereby reducing the work performed by the cooling fan (16) and eventually reducing the input power to the cooling fan (16).

5 Claims, 6 Drawing Sheets

(56) References Cited

U.S. PATENT DOCUMENTS

| | | | | |
|---|---|---|---|---|
| 5,476,138 A * | 12/1995 | Iwasaki et al. | | 165/41 |
| 5,626,202 A * | 5/1997 | Barnes et al. | | 180/68.1 |
| 5,771,961 A * | 6/1998 | Alizadeh | | 165/121 |
| 6,045,330 A * | 4/2000 | Williams | | 416/247 R |
| 6,139,265 A * | 10/2000 | Alizadeh | | 415/208.1 |
| 6,142,733 A * | 11/2000 | Alizadeh et al. | | 415/208.2 |
| 6,155,335 A * | 12/2000 | Acre et al. | | 165/41 |
| 6,318,450 B1 * | 11/2001 | Acre | | 165/67 |
| 6,510,891 B2 * | 1/2003 | Anderson et al. | | 165/67 |
| 6,684,937 B2 * | 2/2004 | Brielmair et al. | | 165/41 |
| 6,708,790 B2 * | 3/2004 | Ozawa et al. | | 180/68.4 |
| 6,832,644 B2 * | 12/2004 | Stauder et al. | | 165/41 |
| 7,287,576 B2 * | 10/2007 | O'Brien | | 165/121 |
| 7,363,961 B2 * | 4/2008 | Mori et al. | | 165/41 |
| 7,481,287 B2 * | 1/2009 | Madson et al. | | 180/68.1 |
| 7,484,925 B2 * | 2/2009 | Carlson et al. | | 415/79 |
| 7,992,664 B2 * | 8/2011 | Kiener et al. | | 180/68.1 |
| 8,267,209 B2 * | 9/2012 | Kuwabara et al. | | 180/68.4 |
| 8,303,244 B2 * | 11/2012 | Alexander et al. | | 415/119 |
| 8,312,949 B2 * | 11/2012 | Hirukawa et al. | | 180/68.1 |
| 2002/0070003 A1 * | 6/2002 | Lenz et al. | | 165/41 |
| 2005/0207894 A1 * | 9/2005 | Park et al. | | 416/223 R |
| 2005/0238481 A1 | 10/2005 | Yamamoto et al. | | |
| 2006/0237175 A1 * | 10/2006 | Hara | | 165/140 |
| 2006/0280598 A1 * | 12/2006 | Alexander et al. | | 415/173.1 |
| 2007/0095511 A1 * | 5/2007 | O'Brien | | 165/121 |
| 2007/0140844 A1 | 6/2007 | Yoshida | | |
| 2008/0047504 A1 * | 2/2008 | Benvenuto et al. | | 123/41.49 |
| 2008/0078340 A1 * | 4/2008 | Havel | | 123/41.49 |
| 2010/0326377 A1 * | 12/2010 | Nam et al. | | 123/41.49 |
| 2011/0114286 A1 * | 5/2011 | Komatsu et al. | | 165/51 |
| 2012/0003097 A1 * | 1/2012 | Cho et al. | | 416/189 |
| 2012/0031591 A1 * | 2/2012 | Eguchi et al. | | 165/121 |
| 2012/0301329 A1 * | 11/2012 | Bilodeau et al. | | 417/312 |
| 2012/0321474 A1 * | 12/2012 | Stevens et al. | | 416/190 |

FOREIGN PATENT DOCUMENTS

| | | |
|---|---|---|
| JP | 2002-67708 A | 3/2002 |
| JP | 2003-56498 A | 2/2003 |
| JP | 2004-156884 A | 6/2004 |
| JP | 2005-178647 A | 7/2005 |
| JP | 2007-040199 A | 2/2007 |
| JP | 2007-192217 A | 8/2007 |
| JP | 2008-19769 A | 1/2008 |

OTHER PUBLICATIONS

Chinese Office Action dated Oct. 10, 2012, issued in corresponding Chinese Patent Application No. 200980129218.4, (12 pages). With English Translation.

International Search Report of PCT/JP2009/068844, mailing date Jan. 19, 2010.

Chinese Decision to Grant a Patent dated May 23, 2013, issued in corresponding Chinese Patent Application No. 200980129218.4 Statement of Relevancy—"The Decision to Grant a Patent has been received.".

* cited by examiner

VEHICLE HEAT-EXCHANGE MODULE AND VEHICLE HAVING THE SAME

TECHNICAL FIELD

The present invention relates to a vehicle heat-exchange module provided at a front section of a vehicle and to a vehicle having the vehicle heat-exchange module.

BACKGROUND ART

A known conventional vehicle heat-exchange module includes a condenser (heat exchanger), a radiator (heat exchanger), a cooling fan that forcibly supplies external air to the condenser and the radiator, and a fan shroud that has an opening portion formed in a substantially circular shape in plan view and that guides external air heat-exchanged by the condenser and the radiator to the cooling fan through the opening portion.

In this vehicle heat-exchange module, a flow that has flown out through the rotation of the cooling fan contains a component traveling from the heat exchangers toward the downstream side and a component in a swirling direction of the cooling fan.

Of those components, the flow component in the swirling direction of the cooling fan does not contribute to the amount of air passing through the heat exchangers. Therefore, in order to reduce the flow component in the swirling direction, stator blades are disposed at the downstream side of the cooling fan.

When a flow passing through the cooling fan collides with the stator blades, the flow in the swirling direction is deflected to flow in the downstream direction, thus reducing the swirling components. As a result, the work performed by the cooling fan can be reduced, thereby eventually suppressing the input power required for rotating the cooling fan (for example, see PTL 1).

CITATION LIST

Patent Literature

{PTL 1}
Japanese Unexamined Patent Application, Publication No. 2007-40199

SUMMARY OF INVENTION

Technical Problem

The efficiency in deflecting the flow in the swirling direction by using the stator blades is affected by the pitch/chord ratio thereof. Here, the pitch means the interval of the stator blades in the circumferential direction, and the chord means the length (blade chord length) joining a leading edge and a trailing edge of each of the stator blades.

However, since the stator blades are radially provided from the center of the rotation of the cooling fan, the pitch of the stator blades is different between a hub side at the center of the cooling fan and a fan tip side at the outer circumference thereof; thus, the pitch/chord ratio of the stator blades is different.

Therefore, if the pitch of the stator blades is set so as to optimize the pitch/chord ratio at the fan tip side, the pitch becomes smaller at the hub side, thus making the pitch/chord ratio very small. As a result, there arise problems in that the flow is not efficiently deflected at the hub side, the cooling fan is increased in weight, and manufacturing of the cooling fan becomes difficult.

Further, if the pitch of the stator blades is set so as to optimize the pitch/chord ratio at the hub side, the pitch and the pitch/chord ratio become too large at the fan tip side at the outer circumference. Thus, there arises a problem in that the flow cannot be reliably deflected.

The present invention has been made in view of these circumstances, and an object thereof is to provide a vehicle heat-exchange module capable of optimizing the pitch/chord ratio for the whole of the stator blades that deflect the flow in the swirling direction produced by a cooling fan, thereby reducing the work performed by the cooling fan and eventually reducing the input power to the cooling fan, and to provide a vehicle having the vehicle heat-exchange module.

Solution to Problem

In order to solve the above-described problems, a vehicle heat-exchange module of the present invention employs the following solutions.

Specifically, according to a first aspect, the present invention provides a vehicle heat-exchange module including: at least one heat exchanger that is arranged close to a front section of an engine of a vehicle; a cooling fan that forcibly supplies external air to the heat exchanger; a fan shroud that has an opening portion formed in a substantially circular shape in plan view and that guides external air heat-exchanged by the heat exchanger to the cooling fan through the opening portion; and a stator blade that is provided in the opening portion and that deflects a swirling component of a flow of the external air passing through the cooling fan, in which an annular ring member is provided for the stator blade between an outer circumference portion of the stator blade and a center portion thereof, and the number of inner-circumference-side blade members that are radially arranged at an inner circumference side of the ring member is different from that of outer-circumference-side blade members that are radially arranged at an outer circumference side of the ring member.

The annular ring member is provided between the outer circumference portion and the inner circumference portion of the stator blade, and the number of the inner-circumference-side blade members arranged at the inner circumference side of the ring member and that of the outer-circumference-side blade members arranged at the outer circumference side thereof are made different; thus, the pitch/chord ratio can be optimized at each of the inner circumference side and the outer circumference side of the stator blade.

Here, the number of the inner-circumference-side blade members for installation is smaller than that of the outer-circumference-side blade members.

Further, the ring member may be provided in twofold or more fashion between the outer circumference portion and the inner circumference portion of the stator blade. In that case, when the numbers of blade members are made different in a stepwise manner from the inner circumference side toward the outer circumference side, the pitch/chord ratio can be more precisely optimized.

In this aspect, the inner-circumference-side blade members and the outer-circumference-side blade members can be respectively formed such that a blade chord length joining a blade leading edge and a blade trailing edge is gradually increased from an inner circumference side of the stator blade toward an outer circumference side thereof.

According to a second aspect, the present invention provides a vehicle heat-exchange module including: at least one heat exchanger that is arranged close to a front section of an engine of a vehicle; a cooling fan that forcibly supplies external air to the heat exchanger; a fan shroud that has an opening portion formed in a substantially circular shape in plan view and that guides external air heat-exchanged by the heat exchanger to the cooling fan through the opening portion; and a stator blade that is provided in the opening portion and that deflects a swirling component of a flow of the external air passing through the cooling fan, in which: the stator blade has blade members radially arranged between an outer circumference portion of the stator blade and a center portion thereof; and the blade members are formed such that a blade chord length joining a blade leading edge and a blade trailing edge is gradually increased from an inner circumference side of the stator blade toward an outer circumference side thereof.

Since the blade chord length of each of the blade members is gradually increased from the inner circumference side of the stator blade toward the outer circumference side thereof, the pitch/chord ratio can be optimized according to any location in the stator blade.

According to a third aspect, the present invention provides a vehicle including the above-described vehicle heat-exchange module.

Advantageous Effects of Invention

According to the present invention, the stator blade is divided by the intermediate ring into the inner-circumference-side stator blade members and the outer-circumference-side stator blade members, and the number of the inner-circumference-side stator blade members and that of the outer-circumference-side stator blade members are made different; thus, the pitch/chord ratio can be set within an appropriate range at each of the inner circumference side of the stator blade and the outer circumference side thereof.

As a result, a flow in the swirling direction produced by the cooling fan can be efficiently deflected by the whole of the stator blade, thereby reducing the work performed by the cooling fan and eventually reducing the input power to the cooling fan. Further, with this reduction, noise caused when external air strikes the stator blade can also be reduced.

Furthermore, according to the present invention, the blade chord length of the stator blade is gradually increased from the inner circumference side toward the outer circumference side; thus, the pitch/chord ratio can be set within an appropriate range at any location in the radial direction of the stator blade. With this structure, a flow in the swirling direction produced by the cooling fan can also be efficiently deflected by the whole of the stator blade, thereby reducing the work performed by the cooling fan and eventually reducing the input power to the cooling fan. Further, with this reduction, noise caused when external air strikes the stator blade can also be reduced.

DESCRIPTION OF EMBODIMENTS

First Embodiment

A first embodiment of the present invention will be described below using FIG. 1.

Figure 1:
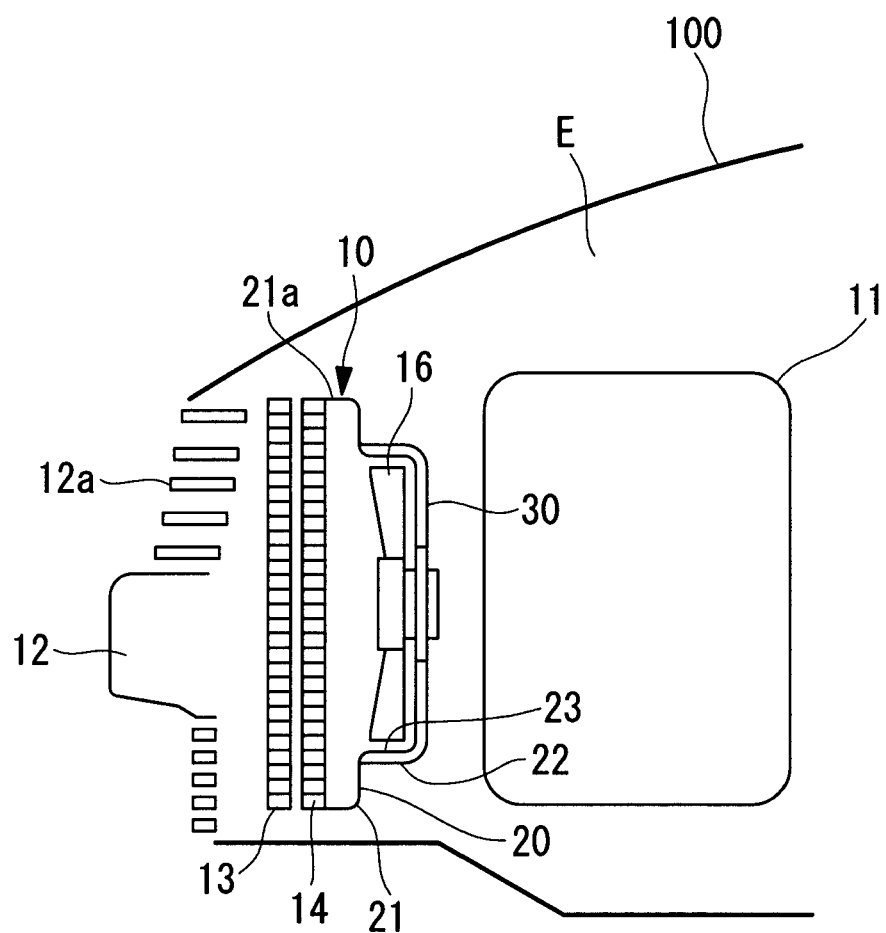
FIG. 1 is a configuration view showing, in outline, part of a vehicle in which a vehicle heat-exchange module according to a first embodiment of the present invention is mounted.

As shown in FIG. 1, a vehicle heat-exchange module (also called "condenser radiator fan module (CRFM)") 10 is provided, together with an engine 11 etc., in an engine compartment E arranged in a front section of a vehicle 100.

In the engine compartment E, on a downstream side of the vehicle heat-exchange module 10 (a rear side in the traveling direction of the vehicle 100), the engine 11 (and/or devices arranged around the engine 11) is arranged close thereto.

The vehicle heat-exchange module 10 is provided close to a rear face side of a bumper 12, and external air passing through a front grille 12a is guided to a front face side of the vehicle heat-exchange module 10.

The vehicle heat-exchange module 10 includes, as main components, a condenser (heat exchanger) 13, a radiator (heat exchanger) 14, a fan shroud 20, and a cooling fan 16. The condenser 13, the radiator 14, and the cooling fan 16 are arranged in this order from the upstream side (the left side in the figure).

The condenser 13 and the radiator 14 are each heat exchangers having a rectangular shape in plan view.

The condenser 13 is one component of a vehicle air-conditioning unit and is configured to cool high-temperature high-pressure refrigerant gas compressed by a compressor, by heat exchange with external air passing through the condenser 13, condensing it to liquid.

The radiator 14 is configured to reduce the temperature of engine cooling water by heat exchange with external air passing through the radiator 14. The cooling fan 16 is used to forcibly supply external air to the radiator 14.

The condenser 13, the radiator 14, and the cooling fan 16 are each conventionally known, and therefore, a detailed description thereof will be omitted here.

Figure 2A:
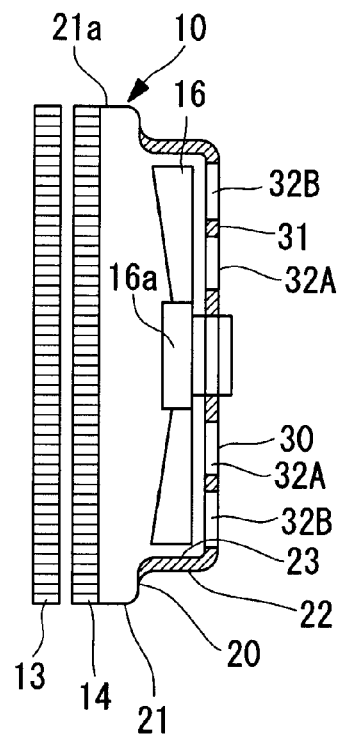
FIG. 2A is a side view of the vehicle heat-exchange module.
Figure 2B:
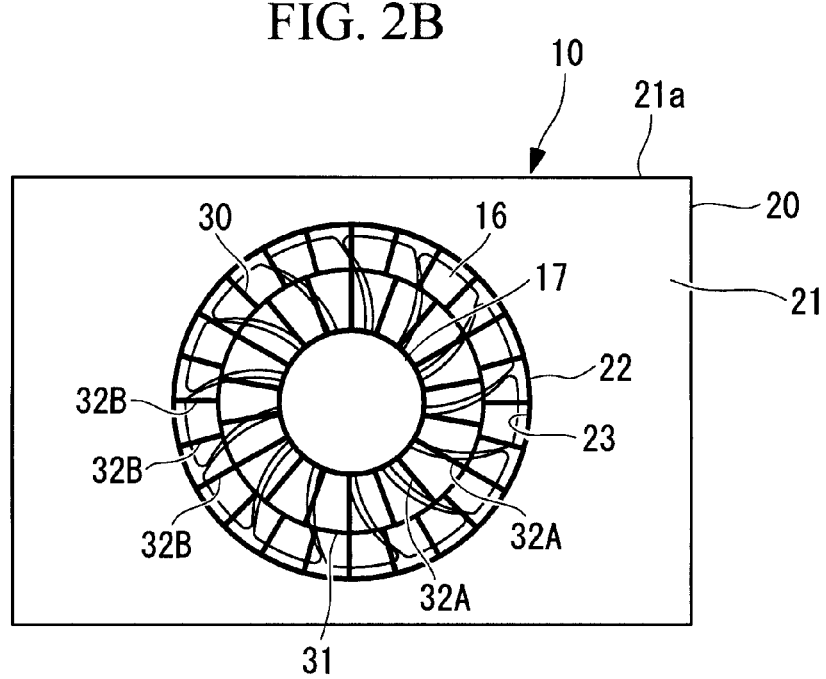
FIG. 2B is a rear view of the vehicle heat-exchange module, seen from a rear side of the vehicle.

As shown in FIG. 1 and FIGS. 2A and 2B, the fan shroud 20 is configured to guide the external air passing through the condenser 13 and the radiator 14 to the cooling fan 16 and has a shroud plate portion 21 whose outer circumference portion 21a is coupled to an outer circumference portion of the radiator 14 and that covers a rear face side of the radiator 14.

In the shroud plate portion 21, a cylindrical bell mouth 22 that has an inner diameter larger than the outer diameter of the cooling fan 16 by a fixed size and that extends rearward of the vehicle body is formed at a position corresponding to the cooling fan 16.

An inner circumference side of the bell mouth 22 serves as a fan opening portion 23. External air passing through the condenser 13 and the radiator 14 is guided to the downstream side through the fan opening portion 23.

A stator blade 30 is provided inside the fan opening portion 23. The stator blade 30 is arranged closer to the rear side of the vehicle body than the cooling fan 16.

As shown in FIG. 2B, the stator blade 30 is provided with, for example, a ring-shaped intermediate ring 31 between the center and the outer circumference thereof. The intermediate ring 31 is concentrically arranged with respect to a motor 17 of the cooling fan 16 located at the center of the fan opening portion 23 and has a diameter such that the distance between the outer-diameter portion of the motor 17 and the outer circumference portion of the stator blade 30 is divided into two parts.

Then, inner-circumference-side stator blade members 32A are provided between the outer diameter portion of the motor 17 of the cooling fan 16 and the intermediate ring 31, and outer-circumference-side stator blade members 32B are provided between the intermediate ring 31 and the outer circumference portion of the stator blade 30. With this structure, the motor 17 of the cooling fan 16 is supported by the stator blade 30. A rotary shaft of the motor 17 is arranged at the radiator 14 side, and a boss 16a of the cooling fan 16 is attached to the rotary shaft.

Here, the number of the inner-circumference-side stator blade members 32A for installation, provided in the circumferential direction, is smaller than that of the outer-circumference-side stator blade members 32B, and the pitch (installation interval (angle) in the circumferential direction) of the inner-circumference-side stator blade members 32A is larger than that of the outer-circumference-side stator blade members 32B. The inner-circumference-side stator blade members 32A have the same blade chord length as the outer-circumference-side stator blade members 32B, here.

In this way, the stator blade 30 is divided by the intermediate ring 31 into the inner-circumference-side stator blade members 32A and the outer-circumference-side stator blade members 32B to make the numbers of the respective stator blade members for installation different; thus the pitch/chord ratio can be set in an appropriate range at each of the inner circumference side and the outer circumference side.

As described above, according to the vehicle heat-exchange module 10 of this embodiment, the stator blade 30, arranged on the downstream side of the cooling fan 16, is divided by the intermediate ring 31 into the inner-circumference-side stator blade members 32A and the outer-circumference-side stator blade members 32B, and the number of the inner-circumference-side stator blade members 32A for installation is set smaller than that of the outer-circumference-side stator blade members 32B; thus, the pitch/chord ratio can be set in the appropriate range at each of the inner circumference side and the outer circumference side.

As a result, the flow in the swirling direction produced by the cooling fan 16 can be efficiently deflected by the whole of the stator blade 30, thereby reducing the work performed by the cooling fan 16 and eventually reducing the input power to the cooling fan 16. Further, with this reduction, noise caused when external air strikes the stator blade 30 can also be reduced.

Here, a comparison is made between a case in which a stator blade having an outer diameter of 320 mm and an inner diameter of 120 mm is divided by the intermediate ring 31 having a diameter of 230 mm into the inner-circumference-side stator blade members 32A and the outer-circumference-side stator blade members 32B, where 22 inner-circumference-side stator blade members 32A and 33 outer-circumference-side stator blade members 32B are provided, and a case in which a conventional stator blade is used, having 9 stator blade members in the circumferential direction, which is not divided by the intermediate ring 31 into the inner circumference side and the outer circumference side.

As a result, the rotational speed of the cooling fan 16 required to obtain an equal amount of draft is reduced by approximately 4% from 1500 rpm to 1440 rpm, and the static pressure efficiency of the cooling fan 16 is increased by approximately 4% from 40% to 44%.

In the above-described first embodiment, only one cooling fan 16 is provided at the center of the vehicle heat-exchange module 10; however, the present invention can be similarly applied to a case where a plurality of cooling fans 16 are provided.

Figure 3:
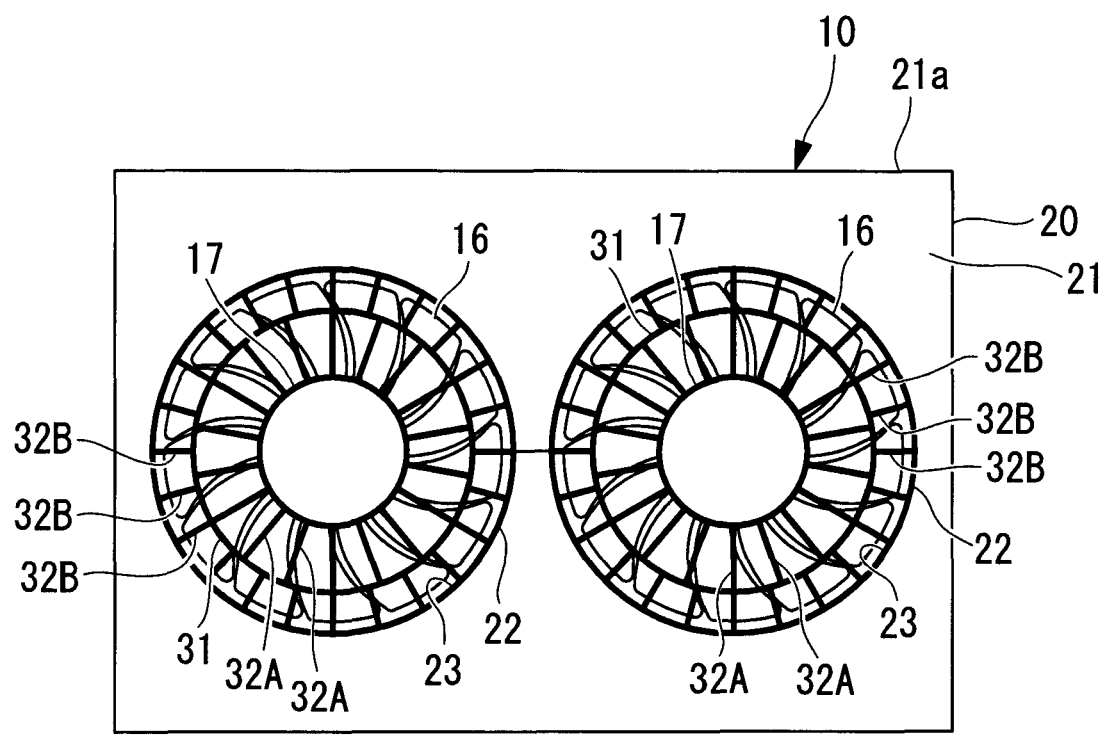
FIG. 3 is a rear view of a vehicle heat-exchange module that includes two cooling fans, which is a modification of the vehicle heat-exchange module according to the first embodiment.

FIG. 3 shows the vehicle heat-exchange module 10 that is provided with two cooling fans 16. As shown in FIG. 3, when the two cooling fans 16 are provided, the stator blade 30 can be made with a structure similar to that of the above-described first embodiment.

Furthermore, in the above-described first embodiment, the stator blade 30 is divided by the intermediate ring 31 into two parts, i.e., the inner-circumference-side stator blade members 32A and the outer-circumference-side stator blade members 32B; however, it can also be divided into three or more parts.

Figure 4A:
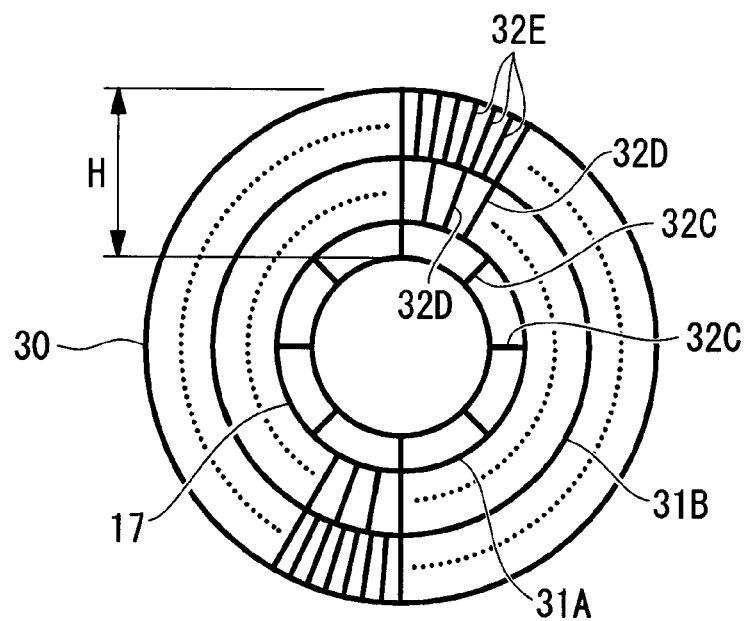
FIG. 4A is a front view showing a modification of a stator blade of the vehicle heat-exchange module according to the first embodiment.
Figure 4B:
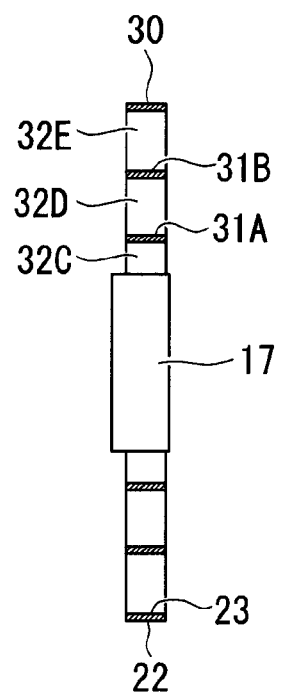
FIG. 4B is a side sectional view showing the modification of the stator blade of the vehicle heat-exchange module according to the first embodiment.

FIGS. 4A and 4B show the stator blade 30 that is divided by two outer and inner intermediate rings 31A and 31B into inner-circumference-side stator blade members 32C, intermediate stator blade members 32D, and outer-circumference-side stator blade members 32E, and the respective stator blade members are provided at appropriate pitches.

It is preferable that, with respect to the difference H (that is, the actual blade length of the stator blade 30) between the outer circumference portion of the stator blade 30 and the outer diameter of the motor 17, the inner intermediate ring 31A be provided at a location approximately 0.1H to 0.2H closer to the outer-diameter side from the outer diameter portion of the motor 17; and, with respect to the vane height H of the cooling fan 16, the outer intermediate ring 31B be provided at a location approximately 0.4H to 0.6H closer to the outer-diameter side from the outer diameter portion of the motor 17. By doing so, the weight of the stator blade 30 can also be effectively suppressed.

Second Embodiment

Next, a second embodiment of the present invention will be described using FIGS. 5A and 5B.

In this embodiment, instead of the stator blade 30 of the first embodiment, a stator blade 40 having a different structure is provided. Therefore, only the stator blade 40 will be described below, identical symbols will be assigned to components common to those in the first embodiment, and a description thereof will be omitted.

Figure 5A:
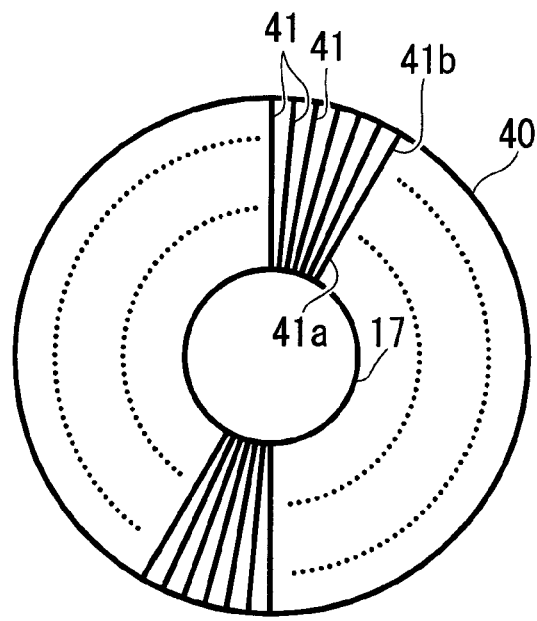
FIG. 5A is a front view showing a stator blade of a vehicle heat-exchange module according to a second embodiment of the present invention.
Figure 5B:
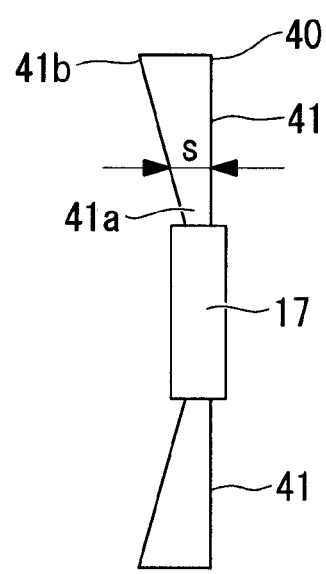
FIG. 5B is a side sectional view showing a modification of the stator blade of the vehicle heat-exchange module according to the second embodiment of the present invention.

As shown in FIGS. 5A and 5B, in the vehicle heat-exchange module 10 of the second embodiment, the stator blade 40 provided on the downstream side of the cooling fan 16 has a plurality of stator blade members 41 radially extending toward the outer circumference portion of the stator blade 40 from the motor 17 of the cooling fan 16, which is located at the center of the fan opening portion 23.

The stator blade members 41 are each formed such that a blade axial length s thereof is gradually increased from an inner-circumference-side end 41a located at the motor 17 side toward an outer-circumference-side end 41b located at the outer circumference portion of the stator blade 40.

Since the flow in the swirling direction coming from the cooling fan 16 can be more efficiently deflected as the blade axial length s becomes larger, appropriate settings can be performed according to the locations in the radial direction of the stator blade 40.

It is preferable that each of the stator blade members 41 be formed such that the blade axial length s is five times as long as the blade thickness.

As described above, according to the vehicle heat-exchange module 10 of this embodiment, the blade axial length s of each of the stator blade members 41 arranged on the downstream side of the cooling fan 16, is gradually increased from the inner circumference side toward the outer circumference side; thus, the pitch/chord ratio can be set within an appropriate range at any location in the radial direction of the stator blade 40.

As a result, the flow in the swirling direction produced by the cooling fan 16 can be efficiently deflected by the whole of the stator blade 40, thereby reducing the work performed by the cooling fan 16 and eventually reducing the input power to the cooling fan 16. Further, with this reduction, noise caused when external air strikes the stator blade 40 can also be reduced.

In the above-described second embodiment, a structure in which the blade axial length s of each of the stator blade members 41 is gradually increased from the inner-circumference-side end 41a toward the outer-circumference-side end 41b is employed; however, this does not mean that a structure in which the blade axial length s is increased in a stepwise manner is excluded.

Further, also in the above-described second embodiment, only one cooling fan 16 is provided at the center of the vehicle heat-exchange module 10; however, the present invention can be similarly applied to a case where a plurality of cooling fans 16 are provided.

Third Embodiment

Next, a third embodiment of the present invention will be described using FIGS. 6A and 6B.

In this embodiment, instead of the stator blades 30 and 40 of the first and second embodiments, a stator blade 50 that is obtained by combining the stator blades 30 and 40 is provided. Therefore, only the stator blade 50 will be described below, identical symbols will be assigned to components common to those in the first embodiment, and a description thereof will be omitted.

Figure 6A:
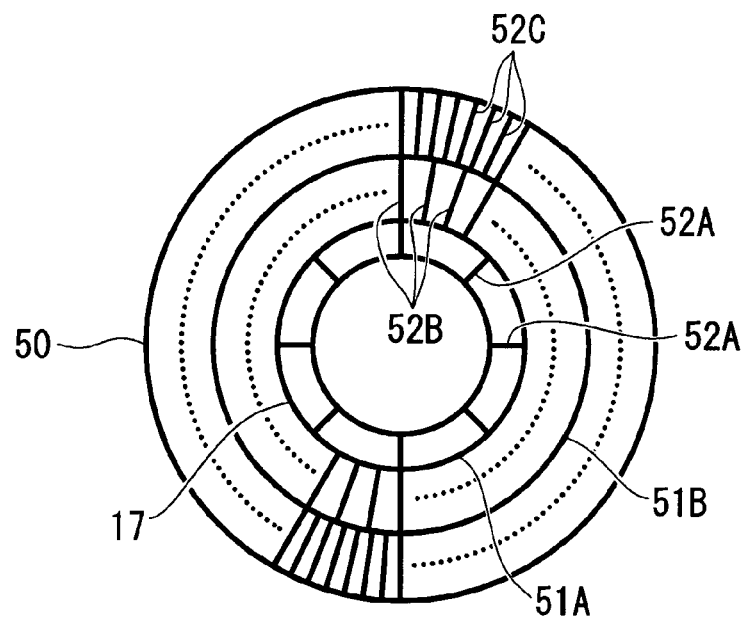
FIG. 6A is a front view showing a stator blade of a vehicle heat-exchange module according to a third embodiment of the present invention.
Figure 6B:
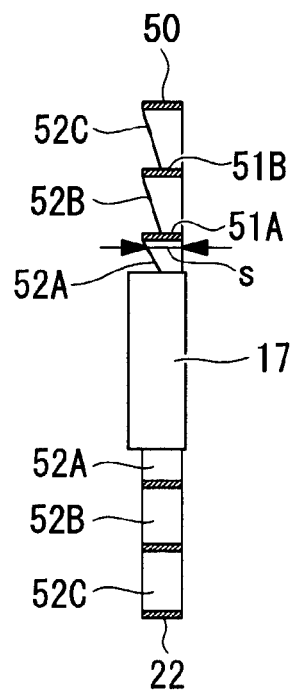
FIG. 6B is a side sectional view showing a modification of the stator blade of the vehicle heat-exchange module according to the third embodiment of the present invention.

As shown in FIGS. 6A and 6B, in the vehicle heat-exchange module 10 of the third embodiment, the stator blade 50 provided on the downstream side of the cooling fan 16 has, for example, two ring-shaped intermediate rings 51A and 51B on the inner circumference side of the fan opening portion 23.

The intermediate rings 51A and 51B are concentrically arranged with respect to the motor 17 of the cooling fan 16 located at the center of the fan opening portion 23 and have diameters such that the distance between the outer diameter portion of the motor 17 and the outer circumference portion of the stator blade 50 is divided into three parts.

Then, inner-circumference-side stator blade members 52A are provided between the outer diameter portion of the motor 17 of the cooling fan 16 and the intermediate ring 51A, intermediate stator blade members 52B are provided between the intermediate ring 51A and the intermediate ring 51B, and outer-circumference-side stator blade members 52C are provided between the intermediate ring 51B and the outer circumference portion of the stator blade 50.

The number of the inner-circumference-side stator blade members 52A for installation, that of the intermediate stator blade members 52B for installation, and that of the outer-circumference-side stator blade members 52C for installation differ from each other, and the stator blade members located closer to the inner circumference side are less provided in the circumferential direction and have a larger pitch (installation interval (angle) in the circumferential direction).

Further, the inner-circumference-side stator blade members 52A, the intermediate stator blade members 52B, and the outer-circumference-side stator blade members 52C are each formed such that the blade axial length s thereof is gradually increased from an inner-circumference-side end toward an outer-circumference-side end.

Since the flow in the swirling direction coming from the cooling fan 16 can be more efficiently deflected as the blade axial length s becomes larger, appropriate settings can be performed according to the locations in the radial direction of the stator blade 50.

In this way, the stator blade 50 is formed such that it is divided by the intermediate rings 51A and 51B into the inner-circumference-side stator blade members 52A, the intermediate stator blade members 52B, and the outer-circumference-side stator blade members 52C, the numbers of the respective stator blade members for installation are made different, and their blade axial lengths s are gradually increased from the inner-circumference-side end toward the outer-circumference-side end; therefore, the pitch/chord ratio can be set within an appropriate range in the whole of the stator blade 50.

As described above, according to the vehicle heat-exchange module 10 of this embodiment, the flow in the swirling direction produced by the cooling fan 16 can be efficiently deflected by the whole of the stator blade 50, thereby reducing the work performed by the cooling fan 16 and eventually reducing the input power to the cooling fan 16.

Further, with this reduction, noise caused when external air strikes the stator blade 50 can also be reduced.

Furthermore, since the third embodiment employs a structure obtained by combining the structures of the above-described first and second embodiments, the stator blade 50 can be lighter in weight.

This is because, in the first embodiment, the inner-circumference-side blade axial length of each of the inner-circumference-side stator blade members 32A and the outer-circumference-side stator blade members 32B is constant, which is larger than the minimum size; and, in the second embodiment, the blade axial length s at the inner-circumference-side end 41a of each of the stator blade members 41 is determined from the strength requirement, and the blade axial length s at the outer-circumference-side end 41b thereof is accordingly increased more than necessary; thus, in either structure, the stator blade 30 or 40 has more weight than necessary.

On the other hand, according to the structure of this embodiment, the blade axial length s can be more optimized to have a minimum size, and thus, the stator blade 50 can be light in weight.

In the above-described third embodiment, a structure having only one cooling fan 16 is employed as an example;

however, in this embodiment, as in the first and second embodiments, a structure having a plurality of cooling fans 16 can also be employed.

Further, in the above-described embodiments, a description has been given of a structure in which the vehicle heat-exchange module 10 is provided with both the condenser 13 and the radiator 14; the present invention is not limited thereto, and only the condenser 13 or only the radiator 14 may be provided.

REFERENCE SIGNS LIST

10 vehicle heat-exchange module
11 engine
13 condenser
14 radiator
16 cooling fan
20 fan shroud
22 bell mouth
23 fan opening portion
30 stator blade
31 intermediate ring
31A intermediate ring
31B intermediate ring
32A inner-circumference-side stator blade members
32B outer-circumference-side stator blade members
32C inner-circumference-side stator blade members
32D intermediate stator blades
32E outer-circumference-side stator blade members
40 stator blade
41 stator blade members
41a inner-circumference-side end
41b outer-circumference-side end
50 stator blade
51A intermediate ring
51B intermediate ring
52A inner-circumference-side stator blade members
52B intermediate stator blade members
52C outer-circumference-side stator blade members

The invention claimed is:

1. A vehicle heat-exchange module comprising:
at least one heat exchanger that is arranged close to a front section of an engine of a vehicle;
a cooling fan that forcibly supplies external air to the heat exchanger;
a fan shroud that has an opening portion formed in a substantially circular shape in plan view and that guides external air heat-exchanged by the heat exchanger to the cooling fan through the opening portion; and
a stator blade that is provided in the opening portion and that deflects a swirling component of a flow of the external air passing through the cooling fan,
wherein an annular ring member is provided for the stator blade between an outer circumference portion of the stator blade and a center portion thereof, and the number of inner-circumference-side blade members that are radially arranged at an inner circumference side of the ring member is different from that of outer-circumference-side blade members that are radially arranged at an outer circumference side of the ring member, and
wherein the inner-circumference-side blade members and the outer-circumference-side blade members are respectively formed such that a blade chord length joining a blade leading edge and a blade trailing edge is gradually increased from an inner circumference side of the stator blade toward an outer circumference side thereof.

2. A vehicle heat-exchange module according to claim 1, wherein the number of the inner-circumference-side blade members for installation is smaller than that of the outer-circumference-side blade members.

3. A vehicle comprising a vehicle heat-exchange module according to claim 1.

4. A vehicle heat-exchange module comprising:
at least one heat exchanger that is arranged close to a front section of an engine of a vehicle;
a cooling fan that forcibly supplies external air to the heat exchanger;
a fan shroud that has an opening portion formed in a substantially circular shape in plan view and that guides external air heat-exchanged by the heat exchanger to the cooling fan through the opening portion; and
a stator blade that is provided in the opening portion and that deflects a swirling component of a flow of the external air passing through the cooling fan, wherein:
the stator blade has blade members radially arranged between an outer circumference portion of the stator blade and a center portion thereof; and
the blade members are formed such that a blade chord length joining a blade leading edge and a blade trailing edge is gradually increased from an inner circumference side of the stator blade toward an outer circumference side thereof.

5. A vehicle comprising a vehicle heat-exchange module according to claim 4.

* * * * *